US008518708B2

(12) United States Patent
Winter

(10) Patent No.: US 8,518,708 B2
(45) Date of Patent: Aug. 27, 2013

(54) LEAK SENSOR FOR FLOWING ELECTROLYTE BATTERIES

(75) Inventor: Rick Winter, Livermore, CA (US)

(73) Assignee: Premium Power Corporation, North Reading, MA (US)

( * ) Notice: Subject to any disclaimer, the term of this patent is extended or adjusted under 35 U.S.C. 154(b) by 0 days.

(21) Appl. No.: 13/550,200

(22) Filed: Jul. 16, 2012

(65) Prior Publication Data

US 2012/0280820 A1 Nov. 8, 2012

Related U.S. Application Data

(63) Continuation of application No. 13/186,224, filed on Jul. 19, 2011, now Pat. No. 8,222,043, which is a continuation of application No. 11/933,162, filed on Oct. 31, 2007, now Pat. No. 7,993,932, which is a continuation of application No. 09/899,523, filed on Jul. 5, 2001, now Pat. No. 7,314,761.

(51) Int. Cl.
*G01N 33/00* (2006.01)

(52) U.S. Cl.
USPC .................. 436/151; 422/82.01; 422/500

(58) Field of Classification Search
USPC ................ 436/151; 422/82.01, 500
See application file for complete search history.

(56) References Cited

U.S. PATENT DOCUMENTS

| | | | |
|---|---|---|---|
| 4,628,302 A | 12/1986 | Barr et al. | |
| 6,242,125 B1 | 6/2001 | Eidler et al. | |
| 6,261,714 B1 | 7/2001 | Eidler et al. | |
| 6,308,728 B1 | 10/2001 | Frazier | |
| 7,314,761 B2 | 1/2008 | Winter | |
| 8,222,043 B2* | 7/2012 | Winter | 436/151 |
| 2003/0008203 A1 | 1/2003 | Winter | |
| 2003/0008204 A1 | 1/2003 | Winter et al. | |

OTHER PUBLICATIONS

U.S. Appl. No. 09/899,523; Requirement for Election/Restriction mailed Dec. 24, 2003.
U.S. Appl. No. 09/899,523; Response to Election/Restriction mailed Dec. 24, 2003; filed Apr. 26, 2004.
U.S. Appl. No. 09/899,523; Office Action mailed Jun. 30, 2004.
U.S. Appl. No. 09/899,523; Response to Office Action mailed Jun. 30, 2004 filed Dec. 3, 2004.
U.S. Appl. No. 09/899,523; Notice re Non-Compliant Amendment mailed Dec. 17, 2004.
U.S. Appl. No. 09/899,523; Response to Notice of Non-Compliant Amendment filed Jan. 10, 2005.
U.S. Appl. No. 09/899,523; Office Action mailed Apr. 5, 2005.
U.S. Appl. No. 09/899,523; Response to Office Action mailed Apr. 5, 2005; filed Jun. 20, 2005.
U.S. Appl. No. 09/899,523; Notice re Non-Compliant Amendment mailed Aug. 19, 2005.
U.S. Appl. No. 09/899,523; Response to Notice of Non-Compliant Amendment filed Aug. 29, 2005.
U.S. Appl. No. 09/899,523; Office Action mailed Oct. 4, 2005.
U.S. Appl. No. 09/899,523; Response to Office Action mailed Oct. 4, 2005; filed Feb. 6, 2006.

(Continued)

*Primary Examiner* — Sam P Siefke
(74) *Attorney, Agent, or Firm* — Lathrop & Gage LLP

(57) ABSTRACT

A leak detection system for a flowing electrolyte battery comprising a containment member associated with at least one of a stack of a flowing electrolyte battery and an electrolyte reservoir of a flowing electrolyte battery and a sensing member for sensing a fluid leak within the containment member.

15 Claims, 2 Drawing Sheets

(56) References Cited

OTHER PUBLICATIONS

U.S. Appl. No. 09/899,523; Office Action mailed Jul. 26, 2006.
U.S. Appl. No. 09/899,523; Response to Office Action mailed Jul. 26, 2006.
U.S. Appl. No. 09/899,523; Office Action mailed Apr. 10, 2007.
U.S. Appl. No. 09/899,523; Response to Office Action mailed Apr. 10, 2007.
U.S. Appl. No. 09/899,523; Notice of Allowance dated Aug. 15, 2007.
U.S. Appl. No. 09/899,523; Issue Fee Payment, Nov. 15, 2007.
U.S. Appl. No. 09/997,724; Petition filed Mar. 19, 2002.
U.S. Appl. No. 09/997,724; Petition filed Jul. 25, 2002.
U.S. Appl. No. 09/997,724; Petition Decision; Aug. 12, 2002.
U.S. Appl. No. 09/997,724; Office Action mailed Jun. 28, 2004.
U.S. Appl. No. 09/997,724; Letter of Express Abandonment filed Dec. 2, 2004.
U.S. Appl. No. 09/997,724; Notice of Abandonment mailed Dec. 10, 2004.
PCT/US02/21564 International Search Report.
Select File History from related U.S. Appl. No. 11/933,162, dated Jul. 8, 2010 through Jul. 20, 2011, 27 pages.
Select File History from U.S. Appl. No. 13/186,224, dated Oct. 6, 2011 to Jun. 27, 2012, 37 pages.

\* cited by examiner

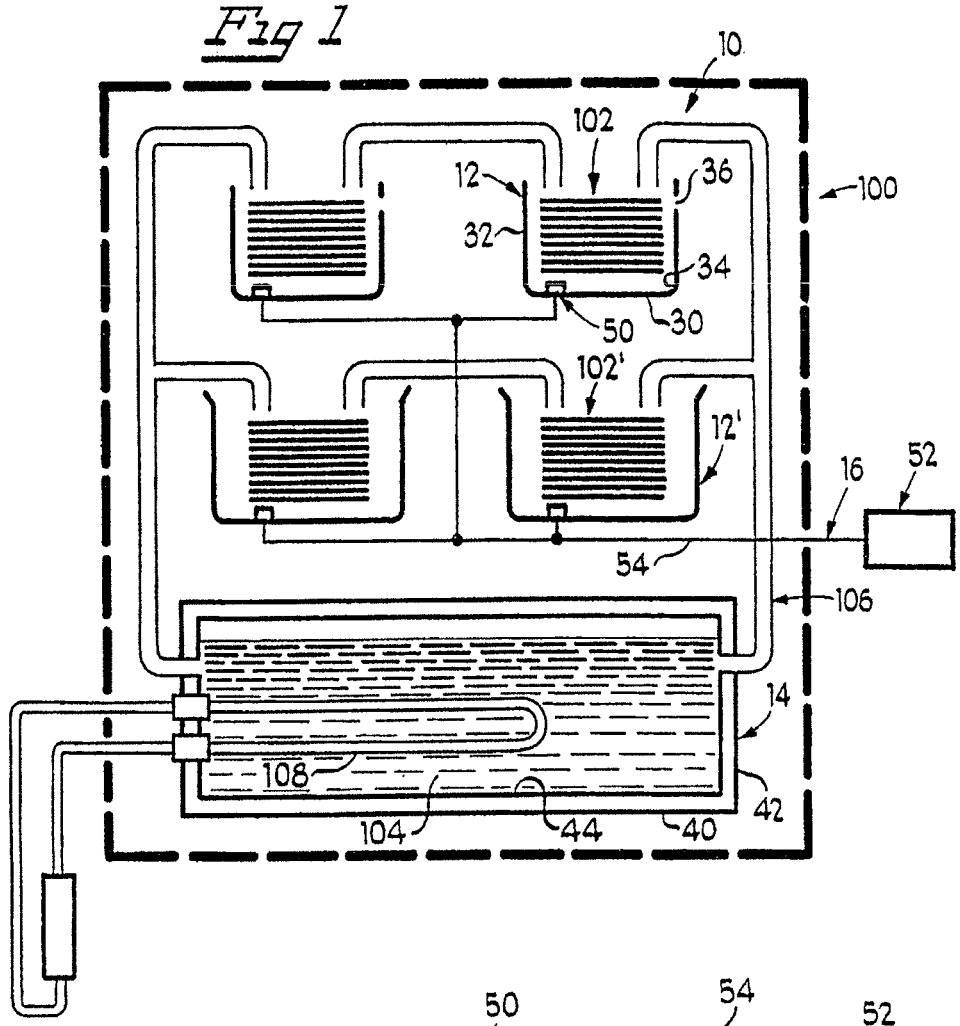
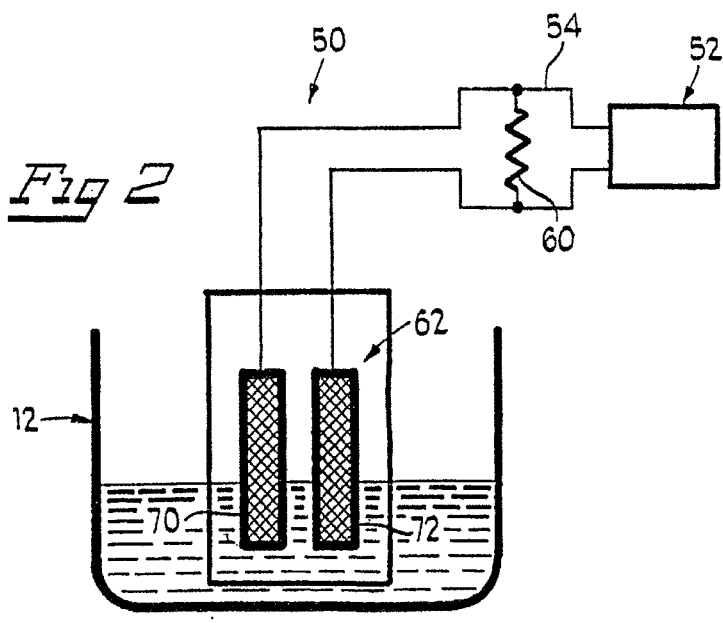

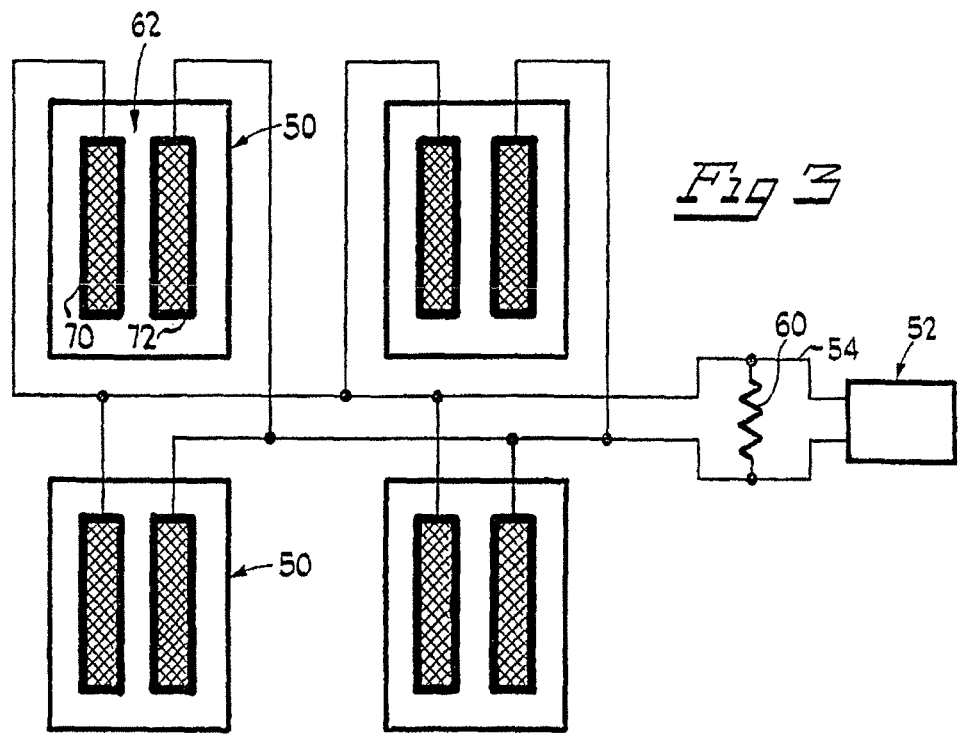
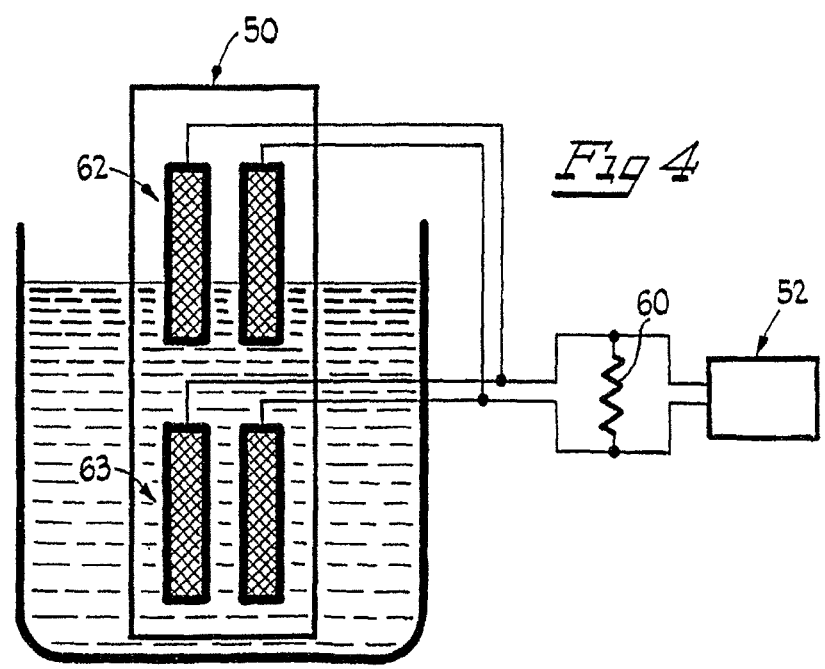

LEAK SENSOR FOR FLOWING ELECTROLYTE BATTERIES

RELATED APPLICATIONS

This application is a continuation of U.S. patent application Ser. No. 13/186,224 filed Jul. 19, 2011, which is a continuation of U.S. patent application Ser. No. 11/933,162 filed Oct. 31, 2007, now U.S. Pat. No. 7,993,932, which is a continuation of U.S. patent application Ser. No. 09/899,523 filed Jul. 5, 2001, now U.S. Pat. No. 7,314,761. Each of the above-identified patent applications is incorporated herein by reference.

BACKGROUND OF THE INVENTION

1. Field of the Invention

The invention is directed to flowing electrolyte batteries, and in particular to a leak sensor for use in association with flowing electrolyte batteries such as zinc/bromine batteries. It will be understood that the application is not limited to any zinc/bromine batteries or to any other particular flowing electrolyte battery.

2. Background Art

Flowing electrolyte batteries (Zn—Br batteries, V-Redox batteries, etc) are well known in the art for their quality power providing characteristics and their cycling ability. Generally, such batteries rely on the circulation, by pumps, of electrolyte. As the circulation of electrolyte includes a multitude of components, fittings and conduits, a potential always exists for failure of one of these components. Such failure will generally result in a leak of electrolyte.

In addition, since many such batteries require cooling systems which likewise comprise a multitude of conduits, fittings and components, the cooling systems are likewise problematic. Failure in such components generally results in a leak of coolant. Further still, many such batteries, especially in industrial applications, are placed in a substantially sealed container which remains exposed to harsh environments. As such, damage to the sealed container often results in the collection of precipitation within the container.

Any leak of electrolyte or coolant, as well as any entry of outside moisture can have catastrophic results. Specifically, not only will it cause the battery to operate in a less than optimal condition, the battery may completely fail. For industrial applications, and especially when used as an emergency power supply, such batteries must be ready for immediate operation. If a battery fails, then it is incapable of providing power in an emergency. Thus, it is important to provide early notification of a leak in such a battery.

Moreover, in the event of a failure, it is important to contain any leaks, thereby precluding contamination of the battery by the leaking fluid. By limiting the contamination caused by the fluid leak, the battery can be more easily repaired and returned to operation.

Thus, it is an object of the invention to facilitate the containment of a leak within a flowing electrolyte battery.

It is a further object of the invention to facilitate the detection of a leak of fluid within a flowing electrolyte battery.

SUMMARY OF THE INVENTION

The invention comprises a leak detection system for a flowing electrolyte battery. The leak detection system comprises a containment member associated with at least one of a stack of a flowing electrolyte battery and an electrolyte reservoir of a flowing electrolyte battery, and, means for sensing a fluid leak within the containment member.

In a preferred embodiment, the sensing means comprises a switch, a controller and a connector. The switch includes a first plate and a second plate. Fluid within the containment member (i.e. a leak) serves to electrically couple the first plate to the second plate, to, in turn, close the switch. The controller is associated with the switch, and, the controller is capable of sensing the condition of the switch. The connector is electrically associating the switch and the controller.

In such an embodiment, the sensing means further comprises a resistor positioned in parallel to the switch. In another such embodiment, the at least one switch comprises a plurality of switches positioned in parallel.

In a preferred embodiment, the containment member comprises a stack leak containment member associated with at least one stack; and an electrolyte reservoir leak containment member associated with at least one reservoir. In one such embodiment, the sensing means is capable of sensing a leak in each of the stack leak containment member and the at least one electrolyte reservoir leak containment member.

In another aspect of the invention, the invention comprises a method for detecting leaks in a flowing electrolyte battery. The method comprises the steps of (a) providing at least one containment member for at least one of the stack and the reservoir; (b) providing at least one sensor; (c) positioning at least one sensor such that a leak collected in the at least one containment member triggers the sensor; (d) providing a controller; and (e) associating the controller with the at least one sensor, such that the controller is capable of electrically communicating with the sensor.

In one embodiment, the step of providing at least one containment member comprises the steps of (a) providing a stack leak containment member; (b) positioning the stack leak containment member such that a leak from the stack is collected by the stack leak containment member; (c) providing a reservoir leak containment member; and (d) positioning the reservoir leak containment member such that a leak from the reservoir is collected by the reservoir leak containment member.

In one embodiment, the step of providing a sensor comprises the steps of (a) providing a sensor for the stack leak containment member; and (b) providing a sensor for the reservoir leak containment member. In such a preferred embodiment, the step of positioning the at least one sensor comprises the steps of (a) positioning a sensor in the stack leak containment member such that a leak collected in the stack leak containment member triggers the sensor; and (b) positioning a sensor in the reservoir leak containment member such that a leak collected in the reservoir leak containment member triggers the sensor.

In another embodiment, the method further includes the step of sensing a fluid leak. Preferably, the method likewise includes the step of determining the type of fluid leak.

BRIEF DESCRIPTION OF THE DRAWINGS

FIG. 1 of the drawings is a schematic representation of the present invention;

FIG. 2 of the drawings is a schematic representation of the sensor of the present invention;

FIG. 3 of the drawings is a schematic representation of multiple sensors of the present invention; and FIG. 4 of the drawings is a schematic representation of a second embodiment of a sensor of the present invention

DETAILED DESCRIPTION

While this invention is susceptible of embodiment in many different forms, there is shown in the drawings and will be described in detail, one specific embodiment with the understanding that the present disclosure is to be considered as an exemplification of the principles of the invention and is not intended to limit the invention to the embodiment illustrated.

Leak detection system 10 is shown in FIG. 1 as comprising stack leak containment member 12, reservoir leak containment member 14 and means 16 for sensing a leak. Leak detection system 10 is for use in association with a flowing electrolyte battery, such as zinc/bromine battery 100. While various flowing electrolyte batteries are contemplated for use, the invention will be described with reference to a zinc/bromine battery solely as an example. Generally; zinc/bromine battery 100 includes one or more stacks, such as stack 102, electrolyte reservoir 104, circulating means 106 and means 108 for controlling the climate within battery 100. Stack 102 includes plurality of arranged anodes and cathodes so as to comprise a plurality of stacked cells. Electrolyte reservoir 104 stores the electrolyte which is circulated by circulation means 106 through stack 102. In certain embodiments, a climate control means 108 may be incorporated to either heat or cool the electrolyte so as to maintain the overall battery within operating parameters.

Electrolyte stack leak containment member 12 is shown in FIG. 1 as comprising base 30 and sides 32 which define cavity 34. As will be understood at least a portion of stack 102 is positioned within cavity 34 such that, in the case of an electrolyte leak in stack 102, such a leak will fill cavity 34. In embodiments such as the embodiment shown in FIG. 1, wherein two vertically oriented stacks 102, 102' form a tower, each stack has its own electrolyte leak containment member, 12, 12'. In such an embodiment, the upper electrolyte leak containment member 12 includes overflow opening 36, which, in turn, directs any overflow of electrolyte into the lower electrolyte leak containment member 12'. In this manner, the spread of electrolyte can be minimized.

Reservoir leak containment member 14 is shown in FIG. 1 as comprising base 40 and sides 42 which define cavity 44. The electrolyte reservoirs are positioned within the reservoir leak containment member such that any leak in the electrolyte reservoirs will be contained by the reservoir leak containment member. In addition, the reservoirs, and, in turn, the reservoir leak containment members are positioned below stack 102 such that, in the event of a leak which overflows electrolyte stack leak containment member 12 (or 12') will be directed into, and contained by, reservoir leak containment member 14.

Sensing means 16 is shown in FIG. 1 as comprising sensor 50, controller 52 and connector 54. Sensor 50, as shown in FIG. 2, includes base resistor 60 and switch 62. Switch 62 is in parallel with resistor 60 and includes surface 70 and surface 72. As will be explained in detail below, in the event of a leak, the leaking fluid contacts surface 70 and surface 72, to, in turn, close the circuit, essentially forming a switch. While other shapes are contemplated, the surfaces 70, 72 comprise mesh surfaces. Such mesh surfaces provide a relatively large surface area for contact of the fluid with the mesh surfaces. While various systems are contemplated, resistor 60 comprises a resistor having a value of 3000 $\Omega$, and the voltage applied to switch 62 and resistor 60 is 24V. Of course, various other circuits are contemplated, wherein the applied voltage may be either lower or higher, and, various resistors are contemplated for use. In other embodiments, the resistor may be omitted wherein the controller views the circuit as an open circuit until such time as the switch is closed.

Connector 54 connects controller 52 to sensor 50 such that controller 52 is capable of sensing the closing of a switch 62 of sensor 50. As will be explained below, if fluid from a leak provides a closed circuit across surfaces 70, 72, then the resistance of the parallel combination of the switch and the resistor effectively decreases, and the current in the system increases (i.e. voltage remains constant, and therefore voltage is equal to resistance times current). Controller 52 comprises a digital microcontroller capable of reading the current change across the resistor and the switch. Of course, various analog or digital systems are contemplated for use.

In operation, a flowing electrolyte battery is first equipped with leak detection system 10. Specifically, stack leak containment member 12 is provided for each stack and each stack is positioned so that a portion is within cavity 34. Additionally, electrolyte reservoirs 104 are positioned within electrolyte reservoir leak containment member 14.

Once the containment members are positioned, sensors 50 are positioned within the cavity of each stack leak containment member. Subsequently, sensors are likewise positioned within the reservoir leak containment member, and likewise in the bottom of the unit (in case of overflow from any of the containment members). Once positioned, each sensor is attached to one or more controllers, such as controller 52, via connectors 54. The sensors are positioned such that a leak that collects in any of the respective containment members (or at the bottom of the unit) will close a circuit about the surfaces 70, 72 of the respective switch 62, which can be sensed by controller 52. Generally, to achieve early recognition of leaks, the sensors are generally positioned proximate the lowest point of the respective containment member.

From time to time, the flowing electrolyte battery can experience an electrolyte leak in, for example stack 102. In such an instance, the electrolyte leak will collect in the respective stack leak containment member 12. As the level of electrolyte in the stack leak containment member increases, eventually, electrolyte will contact both surface 70 and surface 72 of switch 62, thereby effectively closing the circuit. As a result, the current in the circuit will tend to increase, and the increase is sensed by controller 50. Controller 50 can then provide some type of final output (i.e. audible, visual, radio, infra red, connection to a main control unit, etc.) so that a user can be informed of the leak.

Similarly, a leak in the reservoir will tend to cause electrolyte to enter into the reservoir leak containment member. As the level of electrolyte increases in the reservoir leak containment member, electrolyte will contact surfaces 70 and 72 of the sensor positioned within the reservoir leak containment member and the switch will be effectively closed by the electrolyte. In turn, the circuit will exhibit an increased current which will be sensed by the controller.

It will be understood that in certain embodiments which utilize a liquid coolant, a coolant leak can occur. Such a coolant leak will generally collect in the base of the unit or in the reservoir leak containment member. As with the electrolyte leak, as the coolant level rises, the coolant will contact the surfaces 70 and 72 of one of the sensors, thereby effectively closing the switch.

Again, the controller will recognize the closing of the switch. Indeed, any fluid collection (i.e. electrolyte leak, coolant leak, condensation, outside precipitation) within any of the containment members or proximate the base of the flowing electrolyte battery will trigger a sensor switch to close. Since each such fluid generally comprises a different resistivity (i.e. the electrolyte generally exhibits less electrical resistance than coolant or water (contaminated)), current changes sensed by the controller will be different based on the fluid that is causing the closing of the respective switch. In turn, the controller can be programmed to distinguish between the different leaks. In this case, if the controller determines that the cause of the leak is condensation, there is no need to service the battery or to take the battery out of operation.

In another embodiment, as shown in FIG. 3, the sensor may comprise a plurality of switches in parallel with a single resistor. In such an embodiment, each switch may be positioned in a different area, such as the stack leak containment member, the electrolyte reservoir leak containment member and the overflow area of the housing. As such, a leak in any one of these areas will cause fluid in the respective area to close the switch, and in turn, lower the overall resistance of the circuit. The lower resistance (and increased current) is then sensed by the controller which is attached to the sensor. In such an embodiment, the controller can signal a leak, however, the precise location of the leak is not known.

In another embodiment, as shown in FIG. 4, sensor 50 may include an additional switch, namely, switch 63 which is positioned in parallel to switch 62 and resistor 60. When installed, switch 63 is positioned lower than switch 62 such that a leak will first close switch 63 before the leak closes switch 62. As will be understood, a small leak will tend to close switch 62, whereas a large leak will tend to close switch 63 and switch 62. As a result, the controller will receive a first current reading increase as the leak closes switch 63 and a second current reading increase as the leak closes switch 62. Accordingly, the controller can be used to access the severity of the leak.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method for detecting a leak in a flowing electrolyte battery, the flowing electrolyte battery including different first and second stacked cells and a common electrolytic fluid circulating between respective interiors of at least the first and second stacked cells, the method comprising the steps of:
   capturing a leaking fluid in a first containment member at least partially surrounding the first stacked cells;
   directing the captured leaking fluid into a second containment member at least partially surrounding the second stacked cells;
   detecting a presence of the captured leaking fluid in at least one of the first and second containment members;
   determining that the leak has occurred according to the detection of the presence of the captured leaking fluid in at least one the first and second containment members; and
   signaling that the leak has occurred.

2. The method of claim 1, the step of directing comprising directing the captured leaking fluid through an overflow opening in the first containment member and into the second containment member.

3. The method of claim 1, wherein the step of signaling comprises using a signal selected from the group consisting of an audio signal, a visual signal, a radio signal, and infrared signal.

4. The method of claim 1, further comprising directing the captured leaking fluid from the second containment member to a reservoir leak containment member at least partially surrounding an electrolyte reservoir, the electrolyte reservoir for supplying the common electrolytic fluid to at least the first and second stacked cells.

5. A method for detecting a leak in a flowing electrolyte battery, the flowing electrolyte battery including a plurality of stacked cells, a common electrolytic fluid circulating between respective interiors of the plurality of stacked cells, and a plurality of containment members, each containment member at least partially surrounding a respective one of the plurality of stacked cells, the method comprising the steps of:
   capturing a leaking fluid in at least one of the plurality of containment members;
   detecting a presence of the captured leaking fluid in the at least one of the plurality of containment members;
   determining that the leak has occurred according to the detection of the presence of the captured leaking fluid in the at least one the plurality of containment members;
   detecting a first depth of the captured leaking fluid in the at least one of the plurality of containment members; and
   signaling that the leak has occurred.

6. The method of claim 5, further comprising determining a severity of the leak based, at least in part, on the first depth of the captured leaking fluid in the at least one of the plurality of containment members.

7. The method of claim 6, further comprising determining the severity of the leak based, at least in part, on a second depth of the captured leaking fluid in the at least one of the plurality of containment members, the second depth being different from the first depth.

8. The method of claim 7, wherein the step of signaling includes signaling the severity of the leak.

9. The method of claim 5, further comprising determining a property of the leaking fluid based, at least in part, on an electrical resistivity of the leaking fluid.

10. The method of claim 9, further comprising discriminating a type of leaking fluid between a presence of condensation, coolant, and/or uncirculated electrolytic fluid based, at least in part, on the electrical resistivity of the leaking fluid.

11. The method of claim 10, wherein the step of signaling comprises indicating the type of leaking fluid.

12. A method for detecting a leak in a flowing electrolyte battery, the flowing electrolyte battery including a plurality of stacked cells, a common electrolytic fluid circulating between respective interiors of the plurality of stacked cells, an electrolyte reservoir for supplying the common electrolytic fluid to the plurality of stacked cells, and a plurality of containment members, each containment member at least partially surrounding a respective one of the plurality of stacked cells, the method comprising the steps of:
   capturing a first leaking fluid in at least one of the plurality of containment members;
   detecting a presence of the captured first leaking fluid in the at least one of the plurality of containment members;
   determining that the leak has occurred according to the detection of the presence of the captured first leaking fluid in the at least one the plurality of containment members;
   capturing a second leaking fluid in a reservoir leak containment member at least partially surrounding the electrolyte reservoir;
   detecting a presence of the captured second leaking fluid in the reservoir leak containment member;
   determining that the leak has occurred according to the presence of captured second leaking fluid in the reservoir leak containment member; and
   signaling that the leak has occurred.

13. The method of claim 12, the step of signaling comprising signaling detection of at least one of the captured first leaking fluid and the captured second leaking fluid.

14. The method of claim 12, further comprising directing the captured first leaking fluid from the at least one of the plurality of containment members into the reservoir leak containment member.

15. The method of claim 12, the step of signaling comprising using at least one signal selected from the group consisting of an audio signal, a visual signal, a radio signal, or an infrared signal.

* * * * *